(12) United States Patent
Jin

(10) Patent No.: US 10,951,046 B2
(45) Date of Patent: Mar. 16, 2021

(54) BATTERY AND DISCHARGE FET PROTECTION CIRCUIT

(71) Applicant: Samsung SDI Co., Ltd., Yongin-si (KR)

(72) Inventor: Kyong Pil Jin, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 110 days.

(21) Appl. No.: 16/243,626

(22) Filed: Jan. 9, 2019

(65) Prior Publication Data
US 2019/0245361 A1   Aug. 8, 2019

(30) Foreign Application Priority Data

Feb. 2, 2018 (KR) .................. 10-2018-0013576

(51) Int. Cl.
| | | |
|---|---|---|
| *H02J 7/00* | (2006.01) | |
| *H02H 7/18* | (2006.01) | |
| *H01M 10/42* | (2006.01) | |

(52) U.S. Cl.
CPC ......... *H02J 7/0029* (2013.01); *H01M 10/425* (2013.01); *H02H 7/18* (2013.01);
(Continued)

(58) Field of Classification Search
CPC .... H02J 7/0029; H02J 7/0031; H02J 7/00302; H02J 7/00306; H02J 7/00304; H01M 10/425; H01M 2010/4271; H02H 7/18
See application file for complete search history.

(56) References Cited

U.S. PATENT DOCUMENTS

| | | | | |
|---|---|---|---|---|
| 7,394,223 B2 * | 7/2008 | Lai | ........................ | H02J 7/0029 320/134 |
| 7,408,755 B1 * | 8/2008 | Ye | .......................... | H02H 3/025 361/93.1 |

(Continued)

FOREIGN PATENT DOCUMENTS

| | | |
|---|---|---|
| CN | 201478415 U | 5/2010 |
| CN | 103812484 A | 5/2014 |

(Continued)

OTHER PUBLICATIONS

European Patent Office Extended Search Report for patent application No. 19154871.8, dated Jun. 3, 2019, 6 pages.

(Continued)

*Primary Examiner* — Naum Levin
(74) *Attorney, Agent, or Firm* — Lewis Roca Rothgerber Christie LLP

(57) ABSTRACT

A battery protection circuit includes cell terminals electrically connected to a positive electrode and a negative electrode of a battery, external terminals electrically connected to positive and negative electrodes of an electronic device, discharge and charge FETs connected along a high current path between the cell terminals and the external terminals, a controller having a first terminal electrically connected to a control electrode of the discharge FET and a second terminal electrically connected to a gate electrode of the charge FET, and configured to control the charge FET and the discharge FET, a first resistor electrically connected between the control electrode of the discharge FET and the first terminal of the controller, a capacitor electrically connected between the discharge FET and the first terminal of the discharge FET, and a transistor electrically connected between the control electrode of the discharge FET and a second electrode of the discharge FET.

10 Claims, 4 Drawing Sheets

(52) U.S. Cl.
CPC ... *H02J 7/0031* (2013.01); *H01M 2010/4271* (2013.01); *H02J 7/00302* (2020.01); *H02J 7/00304* (2020.01); *H02J 7/00306* (2020.01)

(56) References Cited

U.S. PATENT DOCUMENTS

| | | | |
|---|---|---|---|
| 7,626,371 B2* | 12/2009 | Hoshino | G05F 1/575 |
| | | | 307/150 |
| 8,901,882 B2* | 12/2014 | Song | B60L 55/00 |
| | | | 320/109 |
| 8,981,725 B2* | 3/2015 | Kim | H02H 7/18 |
| | | | 320/134 |
| 9,443,684 B2* | 9/2016 | Lim | H01H 47/26 |
| 10,348,107 B2* | 7/2019 | Sung | H02J 7/0034 |
| 10,355,590 B2* | 7/2019 | Kwak | H02M 3/335 |
| 2002/0121880 A1 | 9/2002 | Yamanaka et al. | |
| 2005/0037241 A1* | 2/2005 | Schneider | H01M 10/0445 |
| | | | 429/9 |
| 2010/0045257 A1 | 2/2010 | Plaideau et al. | |
| 2017/0317512 A1 | 11/2017 | Sung et al. | |

FOREIGN PATENT DOCUMENTS

| | | |
|---|---|---|
| CN | 204334057 U | 5/2015 |
| CN | 107078531 A | 8/2017 |
| KR | 2005-0015387 A | 2/2005 |
| KR | 2012-0127060 A | 11/2012 |
| KR | 10-1435388 B | 8/2014 |

OTHER PUBLICATIONS

Chinese Office Action dated Nov. 2, 2020, issued in corresponding Chinese Patent Application No. 201910072133.2 (7 pages).

\* cited by examiner

BATTERY AND DISCHARGE FET PROTECTION CIRCUIT

CROSS-REFERENCE TO RELATED APPLICATION

This application claims priority to and the benefit of Korean Patent Application No. 10-2018-0013576, filed on Feb. 2, 2018, in the Korean Intellectual Property Office the content of which is herein incorporated by reference in its entirety.

BACKGROUND

1. Field

Aspects of the present invention relate to a battery protection circuit and a battery pack having the same.

2. Description of the Related Art

A battery is provided in the form of a battery pack together with a battery protection circuit for controlling and managing charging and discharging of the battery. The battery contained in the battery pack may malfunction during charging or discharging. In this regard, the battery protection circuit may include various devices for stably controlling charging and discharging of the battery. When external power is connected to the battery pack, a battery cell may be charged with the external power, and when a load is connected to the battery cell, the battery cell may supply power to the load.

For stably driving a motor of an electronic device that generates power using the motor, a high-capacitance capacitor of several hundred or several thousand microfarads (μF) is provided between a battery pack and a motor control circuit. When the battery pack is connected to (e.g., mounted in) the electronic device, or when a voltage is supplied from the battery pack, a high voltage of the battery pack may be directly supplied to the high-capacitance capacitor for charging the high-capacitance capacitor. Accordingly, in a case where there is no inrush limiting means provided in the electronic device, a large inrush current may flow into the electronic device. In such a case, a fuse, provided in the battery pack as a protection circuit, may be damaged and abnormally opened. This may result in breakages of elements for driving the protection circuit. To avoid this, separate circuits capable of softly (e.g., gradually) charging the high-capacitance capacitor are used in the electronic device.

However, the configuration of the circuits used for softly charging the high-capacitance capacitor may cause a time lag at an initial stage of driving the circuits. Also, using a high-performance device for suppressing the inrush current may increase manufacturing cost.

The above information disclosed in this Background section is only for enhancement of understanding of the background of the invention and therefore it may contain information that does not form the prior art.

SUMMARY

Aspects of some embodiments of the present invention are directed to a battery protection circuit, which can softly (e.g., gradually) charge a load capacitor at an initial discharging stage by coupling a first resistor and a capacitor to a discharge FET, and can prevent a battery and the discharge FET from being damaged, or reduce damage thereto, by rapidly cutting off the discharge FET in an event of overdischarge by coupling a transistor and a second resistor to the discharge FET. Aspects of some embodiments of the present invention are directed to a battery pack including the battery protection circuit.

The above and other aspects of the present invention will be described in, or be apparent from, the following description of exemplary embodiments.

According to some embodiments of the present invention, there is provided a battery protection circuit including: cell terminals electrically connected to a positive electrode and a negative electrode of a battery; external terminals electrically connected to a positive electrode and a negative electrode of a charger or an electronic device; a discharge FET connected along a high current path between the cell terminals and the external terminals; a charge FET connected along the high current path between the cell terminals and the external terminals and connected to the discharge FET in series; a controller having a first terminal electrically connected to a control electrode of the discharge FET and a second terminal electrically connected to a gate electrode of the charge FET, and configured to control operations of the charge FET and the discharge FET; a first resistor electrically connected between the control electrode of the discharge FET and the first terminal of the controller; a capacitor electrically connected between the control electrode of the discharge FET and the first terminal of the discharge FET; and a transistor electrically connected between the control electrode of the discharge FET and a second electrode of the discharge FET.

In some embodiments, the charge FET has a first electrode as a drain electrode, a second electrode as a source electrode, and a control electrode as a gate electrode, and the discharge FET has a first electrode as a drain electrode, the second electrode as a source electrode, and the control electrode as a gate electrode.

In some embodiments, the capacitor has a first electrode electrically connected between a second electrode of the first resistor and the control electrode of the discharge FET, and a second electrode electrically connected between the first electrode of the discharge FET and the first electrode of the charge FET.

In some embodiments, the first resistor has a first electrode electrically connected to the first terminal of the controller, and a second electrode electrically connected to the first terminal of the capacitor and the control electrode of the discharge FET.

In some embodiments, the battery protection circuit further includes a second resistor having a first electrode electrically connected to the first terminal of the controller and the first terminal of the first resistor, and a second electrode electrically connected to the control electrode of the transistor.

In some embodiments, the transistor has a base electrode as a control electrode electrically connected to the second electrode of the second resistor, an emitter electrode electrically connected to the control electrode of the discharge FET, the first electrode of the capacitor and the second electrode of the first resistor, and a collector electrode electrically connected to the second electrode of the discharge FET.

In some embodiments, when the discharge FET is deactivated, the transistor and the second resistor reduce a turn-off time of the discharge FET.

In some embodiments, when the discharge FET is activated, the first resistor and the capacitor allow a voltage between a first electrode and the second electrode of the discharge FET to have a linear characteristic for an extended period of time.

In some embodiments, the charge FET has a first electrode electrically connected to the first electrode of the discharge FET, a second electrode electrically connected to an external terminal of the external terminals, and a control electrode electrically connected to the second terminal of the controller.

In some embodiments, the battery pack includes the battery having a positive electrode and a negative electrode electrically connected to the cell terminals of the battery protection circuit.

As described above, according to some embodiments of the present invention, in the battery protection circuit and the battery pack having the same, a load capacitor can be softly charged at an initial discharging stage by coupling a first resistor and a capacitor to a discharge FET. Further, damage to a battery and the discharge FET can be prevented or reduced by rapidly cutting off the discharge FET during over-discharging by coupling a transistor and a second resistor to the discharge FET.

In addition, according to some embodiments of the present invention, in the battery protection circuit and the battery pack having the same, a load capacitor of an electronic device can be softly charged by controlling a driving time of the discharge FET using low-cost elements, including a resistor, a transistor and a capacitor, without installing a separate charging circuit, thereby reducing the manufacturing cost and obviating a need for the space required in installing the separate charging circuit.

DETAILED DESCRIPTION

Hereinafter, a preferred embodiment of the present invention will be described in further detail. Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In addition, in the accompanying drawings, sizes or thicknesses of various components are exaggerated for brevity and clarity. Like numbers refer to like elements throughout.

Figure 1:
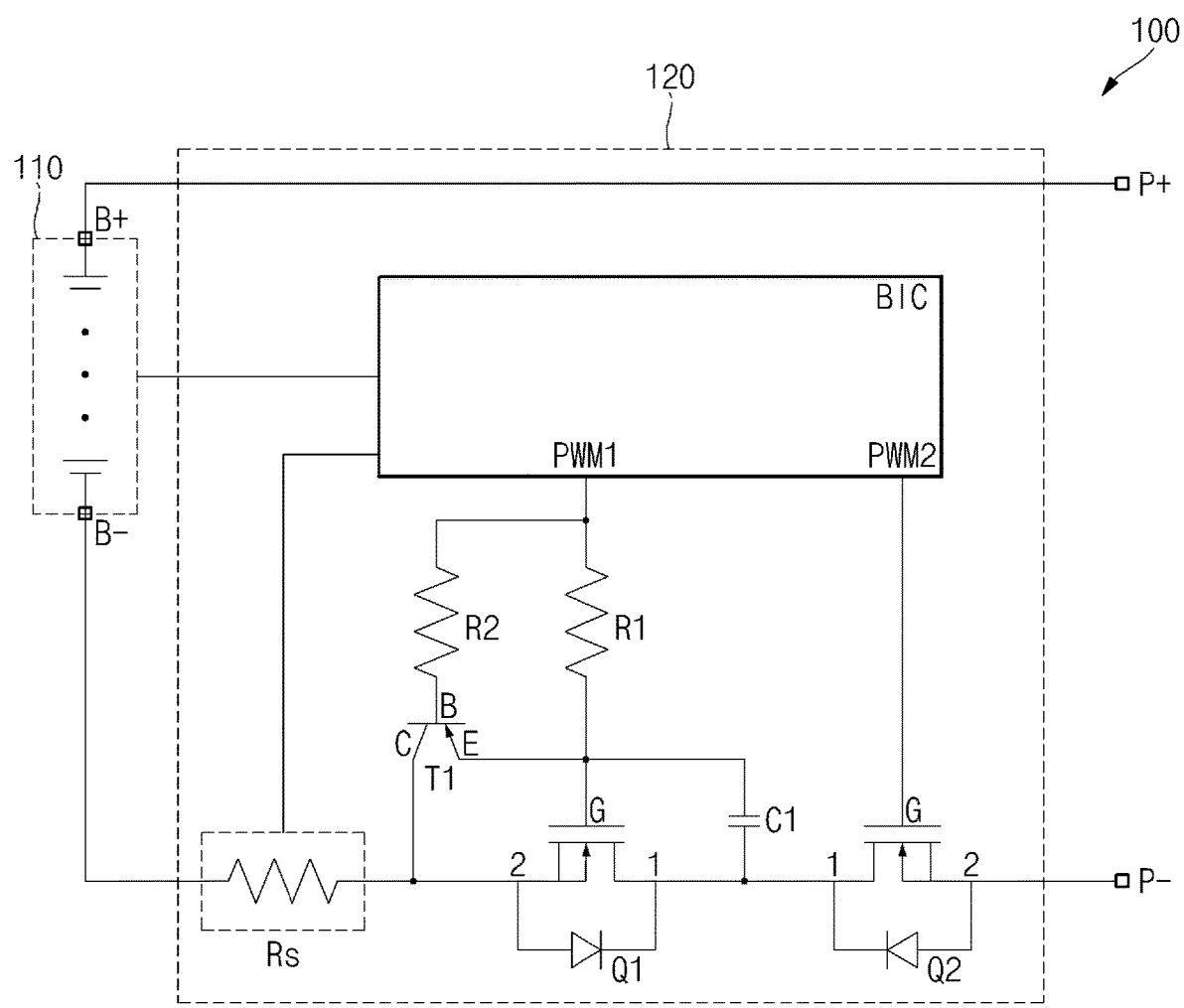
FIG. 1 illustrates a schematic diagram illustrating a configuration of a battery pack according to an exemplary embodiment of the present invention.

Referring to FIG. 1, a schematic diagram illustrating a configuration of a battery pack according to an exemplary embodiment of the present invention is illustrated.

As illustrated in FIG. 1, the battery pack 100 includes a battery 110 and a battery protection circuit 120. The battery protection circuit 120 may be formed by arranging an electric device on a general printed circuit board (PCB) by, for example, spot welding, soldering, and/or the like. The battery 110 may include one or more rechargeable bare cells connected in series or in parallel. Each bare cell of the battery 110 may have, for example, a prismatic shape, a cylindrical shape, a pouch shape, and/or the like.

The battery protection circuit 120 may cut off a high current path when the battery 110 is over-discharged or over-charged. The battery protection circuit 120 may include cell terminals B+ and B−, external terminals P+ and P−, a sensing resistor Rs, a controller (e.g., battery controller) BIC, discharge/charge FETs Q1 and Q2, a capacitor C1, a first resistor R1, a second resistor R2, and a transistor T1.

First, the cell terminals B+ and B− include two terminals to be electrically connected to a positive electrode and a negative electrode of the battery 110, respectively. For example, the cell terminals B+ and B− include a positive cell terminal B+ connected to the positive electrode of the battery 110 and a negative cell terminal B− connected to the negative electrode of the battery 110.

The external terminals P+ and P− include two terminals, which are to be electrically connected to a charger or an electronic device. When the external terminals P+ and P− are electrically connected to the charger, the battery 110 electrically connected to the cell terminals B+ and B− may be charged by a current applied via the charger. When the external terminals P+ and P− are electrically connected to the electronic device, the electronic device may be driven by a voltage output by discharging the battery 110. The external terminals P+ and P− may be connected to the cell terminals B+ and B− in parallel.

The sensing resistor Rs is provided in a high current path between the cell terminals B+ and B− and the external terminals P+ and P− to sense a current flowing along the high current path. The sensing resistor Rs is electrically connected to the controller BIC. The controller BIC may sense charge/discharge current of the battery 110 by, for example, sensing a voltage developed the sensing resistor Rs. In addition, the controller BIC may be electrically connected to the battery 110 to then measure voltages at opposite ends of the cell terminals B+ and B−, thereby measuring the charge/discharge current of the battery 110.

The controller BIC controls charging/discharging operations of the discharge/charge FETs Q1 and Q2 according to the measured charge/discharge current and voltage, thereby protecting the battery 110 from being over-charged/over-discharged.

The discharge/charge FETs Q1 and Q2 include a discharge FET Q1 and a charge FET Q2 connected to the high current path between the cell terminals B+ and B− and the external terminals P+ and P−. Each of the discharge/charge FETs Q1 and Q2 has a control electrode (e.g., a gate electrode) electrically connected to the controller BIC, which may be driven/controlled by the controller BIC.

First, the charge FET Q2 has a control electrode G electrically connected to a second terminal PWM2 of the controller BIC, a second electrode 2 electrically connected to the negative external terminal P−, and a first electrode 1 electrically connected to a first electrode 1 of the discharge FET Q1. In addition, the charge FET Q2 may be deactivated (e.g., disabled or turned off) by a control signal output through the second terminal PWM2 during over-charging, thereby cutting off the high current path.

The discharge FET Q1 has a control electrode electrically connected to a first terminal PWM1 of the controller BIC, a second electrode 2 electrically connected to the negative cell terminal B−, and a first electrode 1 electrically connected to the first electrode 1 of the charge FET Q2. In addition, the discharge FET Q1 may be deactivated (e.g., disabled or turned off) by a control signal output through the first terminal PWM1 of the controller BIC during over-discharging, thereby cutting off the high current path.

In some examples, the control electrodes G of the discharge FET Q1 and the charge FET Q2 may be gate electrodes, the first electrodes 1 may be drain electrodes, and the second electrodes 2 may be source electrodes. In addition, the discharge FET Q1 and the charge FET Q2 may be N-channel field effect transistors. However, embodiments of the present invention are not limited thereto, and the discharge FET Q1 and the charge FET Q2 may be P-channel field effect transistors, according to some examples. In such examples, the first electrodes 1 may be source electrodes, and the second electrodes 2 may be drain electrodes.

In addition, the first resistor R1 may further be electrically connected between the control electrode G of the discharge FET Q1 and the controller BIC. For example, the first resistor R1 may have a first electrode electrically connected to the first terminal PWM1 of the controller BIC and a second electrode electrically connected to the control electrode G of the discharge FET Q1. In addition, the capacitor C1 may further be electrically connected between the control electrode G of the discharge FET Q1 and the first electrode of the discharge FET Q1. For example, the capacitor C1 may have a first electrode electrically connected to the second electrode of the first resistor R1 and the control electrode G of the discharge FET Q1, and may have a second electrode electrically connected to the first electrode 1 of the discharge FET Q1 and the first electrode 1 of the charge FET Q2.

The capacitor C1 may allow a voltage between the first and second electrodes 1 and 2 of the discharge FET Q1 to have a linear characteristic for an extended period of time. The first resistor R1 and the capacitor C1 may delay an initial turn-on time of the discharge FET Q1. A time taken to initially drive the discharge FET Q1 may be controlled by adjusting values of the first resistor R1 and the capacitor C1. For example, a charging time between the control electrode G and the first electrode 1 of the discharge FET Q1 may be extended by adjusting the values of the first resistor R1 and the capacitor C1, thereby allowing the voltage between the first and second electrodes 1 and 2 of the discharge FET Q1 to have a linear characteristic for an extended period of time.

In addition, the transistor T1 may further be electrically connected between the control electrode G and the second electrode 2 of the discharge FET Q1, and the second resistor R2 may further be electrically connected between a control electrode B of the transistor T1 and the first terminal PWM1 of the controller BIC. The transistor T1 may be a PNP transistor having a base electrode B as a control electrode, an emitter electrode E electrically connected to the control electrode G of the discharge FET Q1, and a collector electrode C electrically connected to the second electrode 2 of the discharge FET Q1. The base electrode B of the transistor T1 is electrically connected to the second electrode of the second resistor R2; the emitter electrode E is electrically connected to the control electrode G of the discharge FET Q1, the second electrode of the first resistor R1, and the first electrode of the capacitor C1; and the collector electrode C is electrically connected to the sensing resistor Rs and the second electrode 2 of the discharge FET Q1. In addition, the second resistor R2 may have a first electrode electrically connected to the first electrode of the first resistor R1 and the first terminal PWM1 of the controller BIC and a second electrode electrically connected to the base electrode B of the transistor T1.

The transistor T1 and the second resistor R2 may control a turn-off time of the discharge FET Q1. That is to say, the discharge FET Q1 may be controlled (e.g., set) to be turned off rapidly by adjusting values of the transistor T1 and the second resistor R2 in a suitable manner, thereby rapidly cutting off the high current path during over-discharging.

Figure 2:
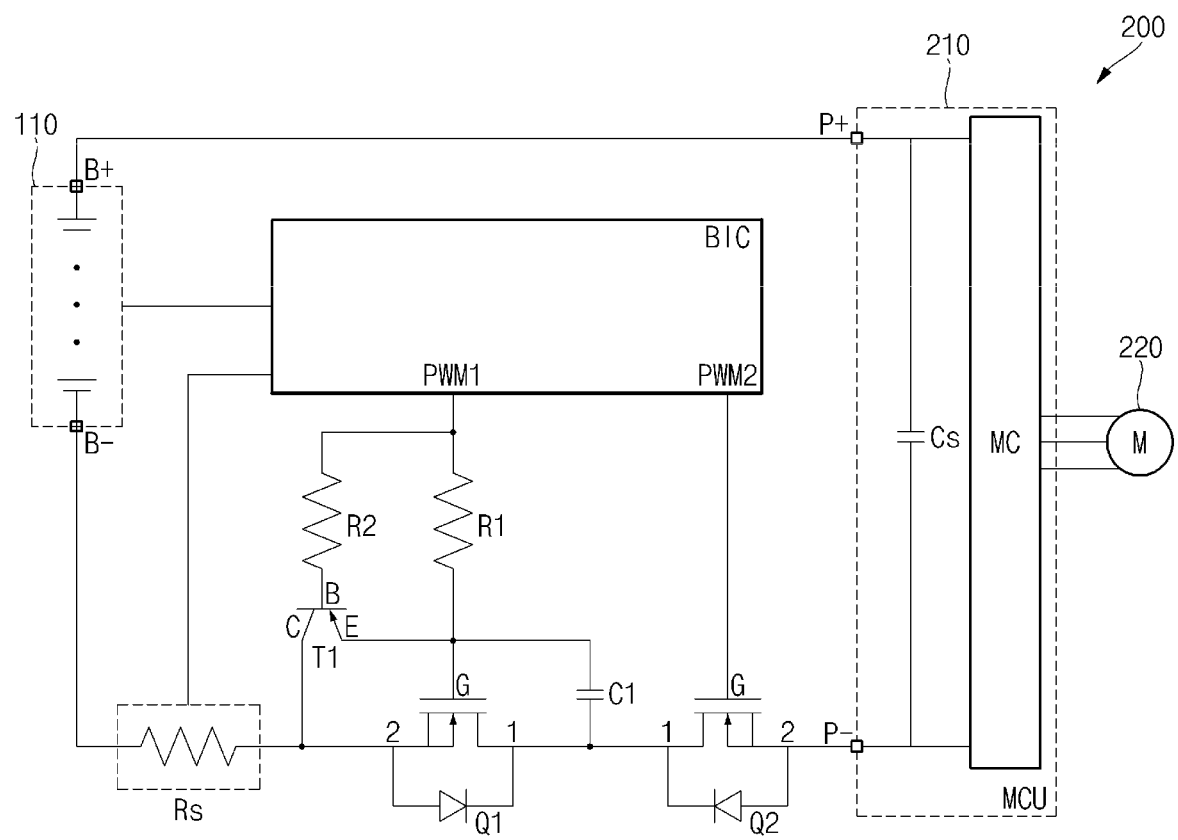
FIG. 2 illustrates a schematic diagram illustrating an example of an electronic device coupled to the battery pack illustrated in FIG. 1.

The driving of the discharge FET Q1 will now be further described by way of example in a case where the electronic device 200, driven by electrical energy supplied to the external terminals P+ and P− of the battery pack 100, is coupled to the battery pack 100, as illustrated in FIG. 2. Here, the electronic device 200 may include a motor 220 and may be driven by power generated from the motor 220.

As illustrated in FIG. 2, the electronic device 200 may include a motor control unit 210 receiving power output through the external terminals P+ and P− of the battery pack 100 to drive a motor and a motor 220 driving the electronic device 200.

Here, the motor control unit 210 includes a high-capacitance load capacitor Cs connected to the external terminals P+ and P−, in parallel to the motor 220, to stably supply power to the motor 220. The motor control unit 210 further includes a motor controller MC for receiving the power of the battery 110 output to the external terminals P+ and P− and for controlling driving of the motor 220. Here, the load capacitor Cs may have a capacitance of 3300 μF, in an example embodiment.

In addition, to softly (e.g., gradually) charge the high-capacitance load capacitor Cs through the discharge FET Q1 without being damaged (e.g., the battery protection circuit 120 of the battery pack 100 may be configured such that the first resistor R1 has a resistance of 3.6 kΩ and the capacitor C1 has a capacitance of 100 nF. The values of the first resistor R1 and the capacitor C1 may be determined according to the value of the load capacitor Cs provided in the electronic device 200, but are not limited to those disclosed in the present invention. As used herein, softly charging may refer to charging an element by reducing or minimizing inrush current, which could otherwise damage the element.

In addition, in a case where only the first resistor R1 and the capacitor C1 are coupled to the discharge FET Q1 of the battery protection circuit 120, the turn-off time and the turn-on time of the discharge FET Q1 may be delayed (like the turn-on time of the discharge FET Q1 being delayed) thereby extending a time taken to cut off the discharge FET Q1 during over-charging and ultimately causing a damage to the battery 110. According to the present invention, however, the transistor T1 and the second resistor R2 are coupled to the discharge FET Q1, thereby reducing the turn-off time of the discharge FET Q1 during over-charging and ultimately protecting the battery 110.

The second resistor R2 may have a resistance of 10 kΩ, and the transistor T1 may be a PNP transistor. To prevent the load capacitor Cs from being damaged, the second resistor R2 and the transistor T1 may be provided to reduce the turn-off time of the discharge FET Q1, which is extended when the initial driving time of the discharge FET Q1 is delayed, and values of the second resistor R2 and the transistor T1 may be determined (or set) according to the values of the first resistor R1 and the capacitor C1.

Figure 3A:
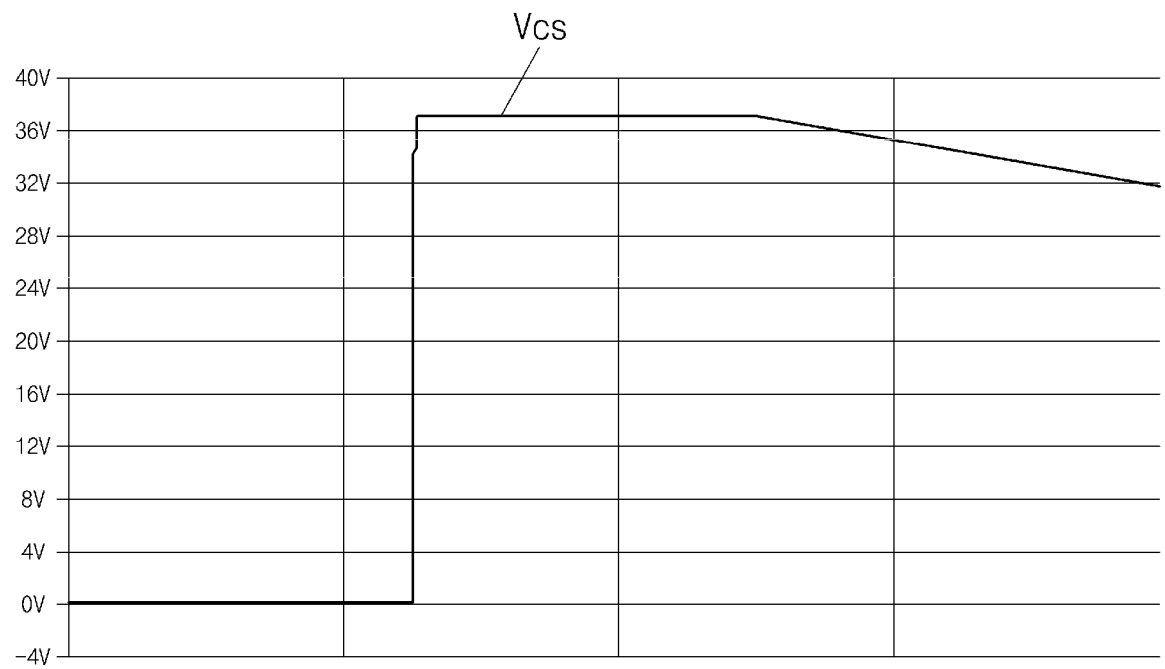
FIGS. 3A-3D are driving simulation waveform diagrams of the electronic device illustrated in FIG. 2, according to an exemplary embodiment of the present invention.
Figure 3B:
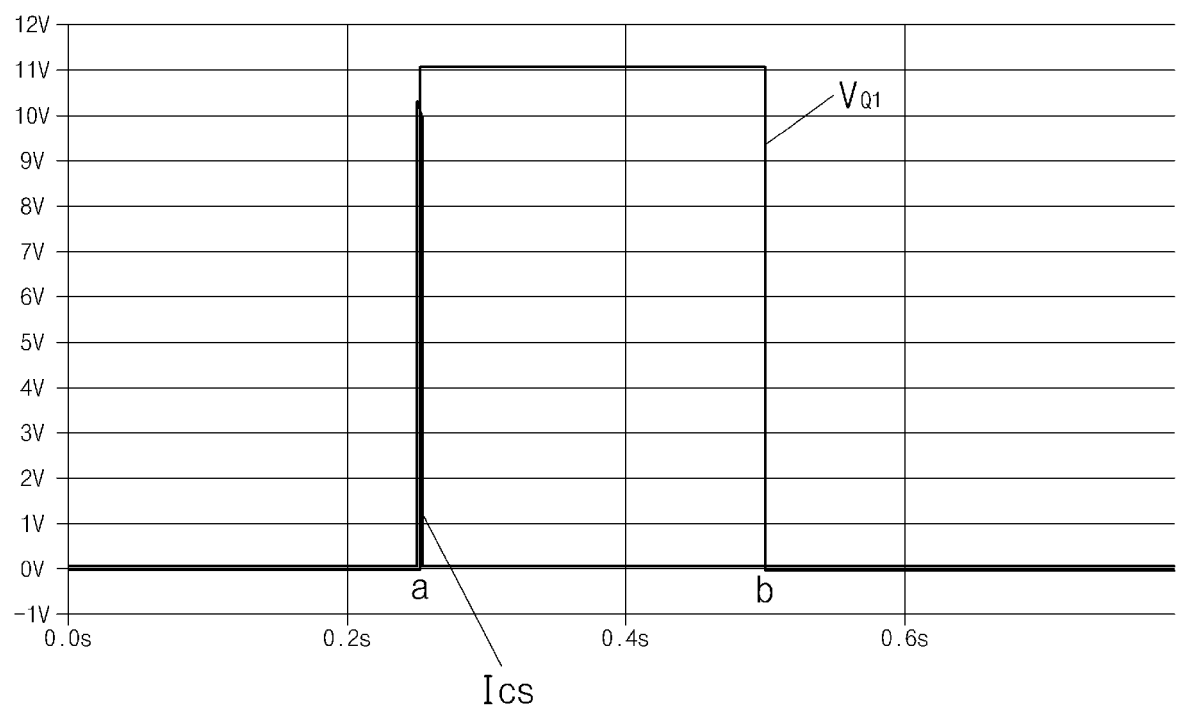
Figure 3C:
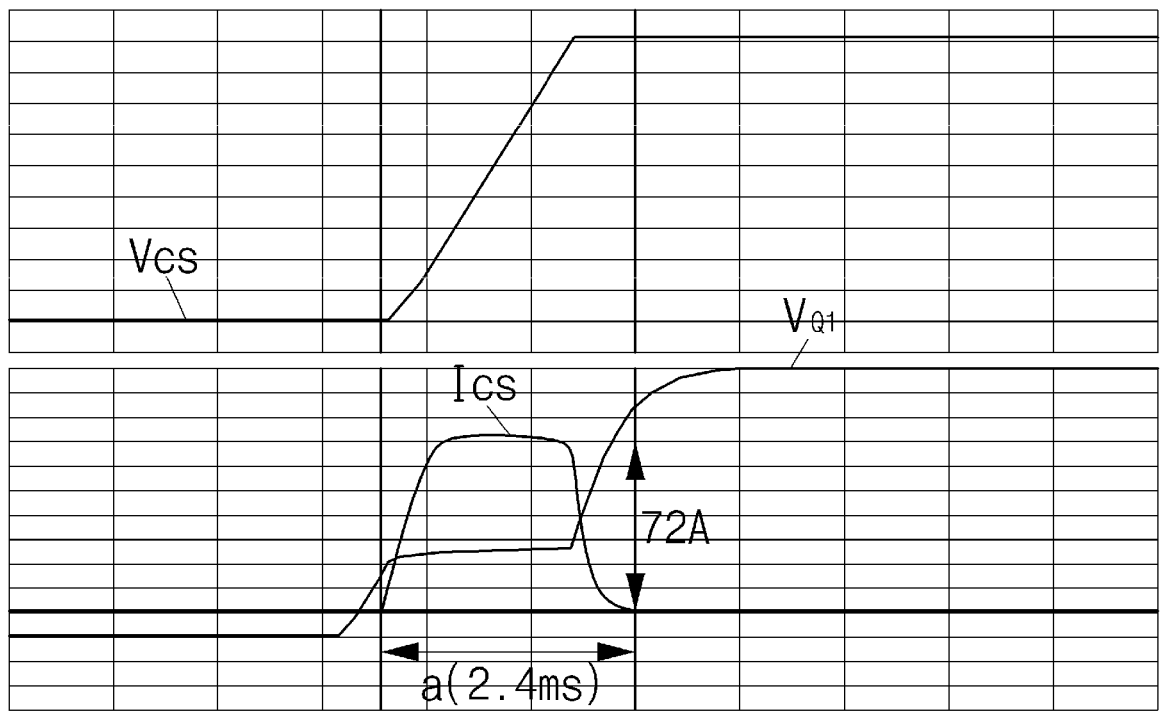
Figure 3D:

Referring to FIGS. 3A-3D, there are illustrated simulation results of a voltage Vcs of the load capacitor Cs (see, FIG. 3A), a charge current Ics for charging the load capacitor Cs (see, FIG. 3B), and a voltage $V_{Q1}$ of the discharge FET Q1 at an initial driving time after the electronic device 200 is coupled to the battery pack 100 shown in FIG. 2. In FIG. 3C, a first time (a) refers to a time taken to complete charging of the load capacitor Cs after a signal for turning on the discharge FET Q1 is applied from the controller BIC to the discharge FET Q1. In FIG. 3D, a second time (b) refers to a time taken for a voltage between the gate electrode G and the second (e.g., source) electrode 2 of the discharge FET Q1 to become zero after a signal for turning off the discharge FET Q1 is applied from the controller BIC to the discharge FET Q1.

For example, in a case where the electronic device 200 is connected to the battery pack 100 or a signal for turning on the discharge FET Q1 is applied from the controller BIC to supply power from the battery pack 100 to the electronic device 200, if the discharge FET Q1 is slowly turned on for the first time (a), an inrush current (i.e., the charge current Ics) may flow along the electronic device 200 to then charge the load capacitor Cs. Here, the inrush current Ics may, for example, be limited to approximately 72 amps (A) due to the presence of the first resistor R1 and the capacitor C1 coupled to the discharge FET Q1, and the load capacitor Cs may be charged for approximately 2.4 milliseconds (ms). That is to say, because the load capacitor Cs can be charged within approximately 2.4 ms after the signal for turning on the discharge FET Q1 is applied to the discharge FET Q1, damage to the load capacitor Cs provided in the electronic device 200 resulting from excess current output from the battery pack 100 may be prevented or reduced, and a charging delay of the load capacitor Cs can also be prevented or reduced.

In addition, in a case where a signal for turning off the discharge FET Q1 is applied from the controller BIC, the discharge FET Q1 is turned off within the second time (b). If the discharge FET Q1 is turned off, a voltage between the gate G and the source electrode 2 of the discharge FET Q1 becomes zero.

Here, the discharge FET Q1 may be cut off within the second time (b), for example, 20 microseconds (µs), by the transistor T1 and the second resistor R2. That is to say, when it is desirable to cut off the high current path of the battery pack 100 due to, for example, over-discharging, the discharge FET Q1 may be rapidly turned off, thereby preventing the battery 110 and the discharge FET Q1 from being damaged, or reducing damage thereto, as a result of over-discharging.

In the battery pack 100 according to the present invention, the load capacitor Cs can be softly charged by the inrush current at an initial discharging time by coupling the first resistor R1, the second resistor R2, the capacitor C1, and the transistor T1 to the discharge FET Q1. In addition, damage to the battery 110 can be prevented or reduced during over-discharging by rapidly cutting off the discharge FET Q1. In addition, the battery pack 100 controls discharging of the discharge FET Q1 using the transistor T1, the first resistor R1, the second resistor R2 and the capacitor C1 (which are relatively cheap to use and implement in the design) to softly charge the load capacitor Cs of the electronic device 200. That is to say, because it is not necessary to install a separate charging circuit, the manufacturing cost can be reduced and there is no need to dedicate space for installing the separate charging circuit.

As used herein, the term "and/or" includes any and all combinations of one or more of the associated listed items. In addition, it will be understood that when an element A is referred to as being "connected to" or "coupled to" an element B, the element A can be directly connected to the element B or an intervening element C may be present and the element A and the element B are indirectly connected to each other. When an element or layer is referred to as being "directly on," "directly connected to", "directly coupled to", or "immediately adjacent" another element or layer, there are no intervening elements or layers present.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below. In addition, it will also be understood that when a layer is referred to as being "between" two layers, it can be the only layer between the two layers, or one or more intervening layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the use of "may" when describing embodiments of the inventive concept refers to "one or more embodiments of the inventive concept." Also, the term "exemplary" is intended to refer to an example or illustration.

As used herein, the terms "use," "using," and "used" may be considered synonymous with the terms "utilize," "utilizing," and "utilized," respectively.

The battery protection circuit and/or any other relevant devices or components, such as the controller BIC and the battery controller MC, according to embodiments of the present invention described herein may be implemented utilizing any suitable hardware, firmware (e.g. an application-specific integrated circuit), software, or a suitable combination of software, firmware, and hardware. For example, the various components of the battery protection circuit may be formed on one integrated circuit (IC) chip or on separate IC chips. Further, the various components of the battery protection circuit may be implemented on a flexible printed circuit film, a tape carrier package (TCP), a printed circuit board (PCB), or formed on a same substrate. Further, the various components of the battery protection circuit may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While the battery protection circuit according to the present invention and the battery pack having the same have been particularly shown and described with reference to exemplary embodiments thereof, it will be understood by those of ordinary skill in the art that various suitable changes in form and details may be made therein without departing from the spirit and scope of the present invention as defined by the following claims, and equivalents thereof.

What is claimed is:

1. A battery protection circuit comprising:
   cell terminals electrically connected to a positive electrode and a negative electrode of a battery;
   external terminals electrically connected to a positive electrode and a negative electrode of a charger or an electronic device;
   a discharge FET connected along a high current path between the cell terminals and the external terminals;
   a charge FET connected along the high current path between the cell terminals and the external terminals and connected to the discharge FET in series;
   a controller having a first terminal electrically connected to a control electrode of the discharge FET and a second terminal electrically connected to a control electrode of the charge FET, and configured to control operations of the charge FET and the discharge FET;
   a first resistor electrically connected between the control electrode of the discharge FET and the first terminal of the controller;
   a capacitor electrically connected between the control electrode of the discharge FET and a first electrode of the discharge FET; and
   a transistor electrically connected between the control electrode of the discharge FET and a second electrode of the discharge FET to electrically connect the control electrode of the discharge FET to the second electrode of the discharge FET when the transistor is turned on.

2. The battery protection circuit of claim 1, wherein the charge FET has a first electrode as a drain electrode, a second electrode as a source electrode, and the control electrode as a gate electrode, and
   wherein the discharge FET has the first electrode as a drain electrode, the second electrode as a source electrode, and the control electrode as a gate electrode.

3. The battery protection circuit of claim 1, wherein the first resistor has a first electrode electrically connected to the first terminal of the controller, and the second electrode electrically connected to a first electrode of the capacitor and the control electrode of the discharge FET.

4. The battery protection circuit of claim 1, further comprising a second resistor having a first electrode electrically connected to the first terminal of the controller and a first electrode of the first resistor, and a second electrode electrically connected to a control electrode of the transistor.

5. The battery protection circuit of claim 4, wherein the transistor has a base electrode as the control electrode electrically connected to the second electrode of the second resistor, an emitter electrode electrically connected to the control electrode of the discharge FET, the first electrode of the capacitor and the second electrode of the first resistor, and a collector electrode electrically connected to the second electrode of the discharge FET.

6. The battery protection circuit of claim 5, wherein when the discharge FET is deactivated, the transistor and the second resistor reduce a turn-off time of the discharge FET.

7. The battery protection circuit of claim 1, wherein when the discharge FET is activated, the first resistor and the capacitor allow a voltage between the first electrode and the second electrode of the discharge FET to have a linear characteristic for an extended period of time.

8. The battery protection circuit of claim 1, wherein the charge FET has the first electrode electrically connected to the first electrode of the discharge FET, a second electrode electrically connected to an external terminal of the external terminals, and the control electrode electrically connected to the second terminal of the controller.

9. A battery pack having the battery protection circuit of claim 1, the battery pack comprising the battery, the battery having the positive electrode and the negative electrode electrically connected to the cell terminals of the battery protection circuit.

10. A battery protection circuit comprising:
    cell terminals electrically connected to a positive electrode and a negative electrode of a battery;
    external terminals electrically connected to a positive electrode and a negative electrode of a charger or an electronic device;
    a discharge FET connected along a high current path between the cell terminals and the external terminals;
    a charge FET connected along the high current path between the cell terminals and the external terminals and connected to the discharge FET in series;
    a controller having a first terminal electrically connected to a control electrode of the discharge FET and a second terminal electrically connected to a control electrode of the charge FET, and configured to control operations of the charge FET and the discharge FET;
    a first resistor electrically connected between the control electrode of the discharge FET and the first terminal of the controller;
    a capacitor electrically connected between the control electrode of the discharge FET and a first electrode of the discharge FET; and
    a transistor electrically connected between the control electrode of the discharge FET and a second electrode of the discharge FET, wherein the capacitor has a first electrode electrically connected between a second electrode of the first resistor and the control electrode of the discharge FET, and a second electrode electrically connected between the first electrode of the discharge FET and a first electrode of the charge FET.

* * * * *

UNITED STATES PATENT AND TRADEMARK OFFICE
CERTIFICATE OF CORRECTION

PATENT NO.         : 10,951,046 B2
APPLICATION NO.    : 16/243626
DATED              : March 16, 2021
INVENTOR(S)        : Jin It is certified that error appears in the above-identified patent and that said Letters Patent is hereby corrected as shown below:

In the Claims
Column 10, Line 9, Claim 3    delete "a" and insert -- the --

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*